US009361543B2

(12) United States Patent
Schertler et al.

(10) Patent No.: US 9,361,543 B2
(45) Date of Patent: Jun. 7, 2016

(54) AUTOMATIC LEARNING METHOD FOR THE AUTOMATIC LEARNING OF FORMS OF APPEARANCE OF OBJECTS IN IMAGES

(75) Inventors: Klaus Schertler, Garching (DE); Jörg Liebelt, Taufkirchen (DE)

(73) Assignee: Airbus Defence and Space GmbH, Ottobrunn (DE)

(*) Notice: Subject to any disclaimer, the term of this patent is extended or adjusted under 35 U.S.C. 154(b) by 0 days.

(21) Appl. No.: 14/344,390

(22) PCT Filed: Aug. 13, 2012

(86) PCT No.: PCT/DE2012/100238
§ 371 (c)(1),
(2), (4) Date: May 22, 2014

(87) PCT Pub. No.: WO2013/037357
PCT Pub. Date: Mar. 21, 2013

(65) Prior Publication Data
US 2014/0328537 A1 Nov. 6, 2014

(30) Foreign Application Priority Data

Sep. 14, 2011 (DE) .......................... 10 2011 113 154

(51) Int. Cl.
*G06K 9/62* (2006.01)
(52) U.S. Cl.
CPC .................... *G06K 9/6256* (2013.01)
(58) Field of Classification Search
None
See application file for complete search history.

(56) References Cited

U.S. PATENT DOCUMENTS

2006/0074834 A1 4/2006 Dong et al.
2010/0226564 A1 9/2010 Marchesotti et al.

FOREIGN PATENT DOCUMENTS

EP 2434434 A2 3/2012
WO 2009/152390 A2 12/2009

OTHER PUBLICATIONS

Li et al, Human Upper Body Pose Recognition Using Adaboost Template for Natural Human Robot Interaction, 2010, Canadian Conference Computer and Robot Vision, IEEE, pp. 370-377.*

(Continued)

*Primary Examiner* — David F Dunphy
(74) *Attorney, Agent, or Firm* — Hoffmann & Baron, LLP

(57) ABSTRACT

An automatic learning method for the automatic learning of the forms of appearance of objects in images in the form of object features from training images for using the learned object features in an image processing system comprises determining a feature contribution by a training image to object features by weighted summation of training image features by means of linear filter operations, applied to the feature image, by using a weight image obtained at least from an annotation image and a classification image. This allows faster learning processes and also the learning of a greater variance of forms of appearance of objects and backgrounds, which increases the robustness of the system in its application to untrained images.

18 Claims, 2 Drawing Sheets

(56) References Cited

OTHER PUBLICATIONS

Jin et al, Online Real Adaboost with Co-training for Object Tracking, 2009, Proc. of SPIE vol. 7495, pp. 1-8.*
English translation of the International Preliminary Report on Patentability issued in PCT/DE2012/100238 on Mar. 27, 2014.
Theodoridis, S. et al., "Pattern Recognition, Passage", Jan. 1, 2009, Pattern Recognition, Academic Press, Burlington, MA, pp. V-XIII, 262.
Duda, Richard, O., et al., "Pattern Classification", Oct. 1, 2000, John Wiley & Sons, Inc.
Yijun Sun, "Iterative Relief for Feature Weighting: Algorithims, Theories and Applications", IEEE Transactions on Pattern Analysis and Machine Intelligence, IEEE Service Center, Los Alamitos, CA, vol. 29, No. 6, Jun. 1, 2007, pp. 1035-1051.
Torralba, Antonio, et al., "Sharing Visual Features for Multiclass and Multiview Object Detection", IEEE Transactions on Pattern Analysis and Machine Intelligence, IEEE Service Center, Los Alamitos, CA, vol. 29, No. 5, May 1, 2007, pp. 854-869.

* cited by examiner

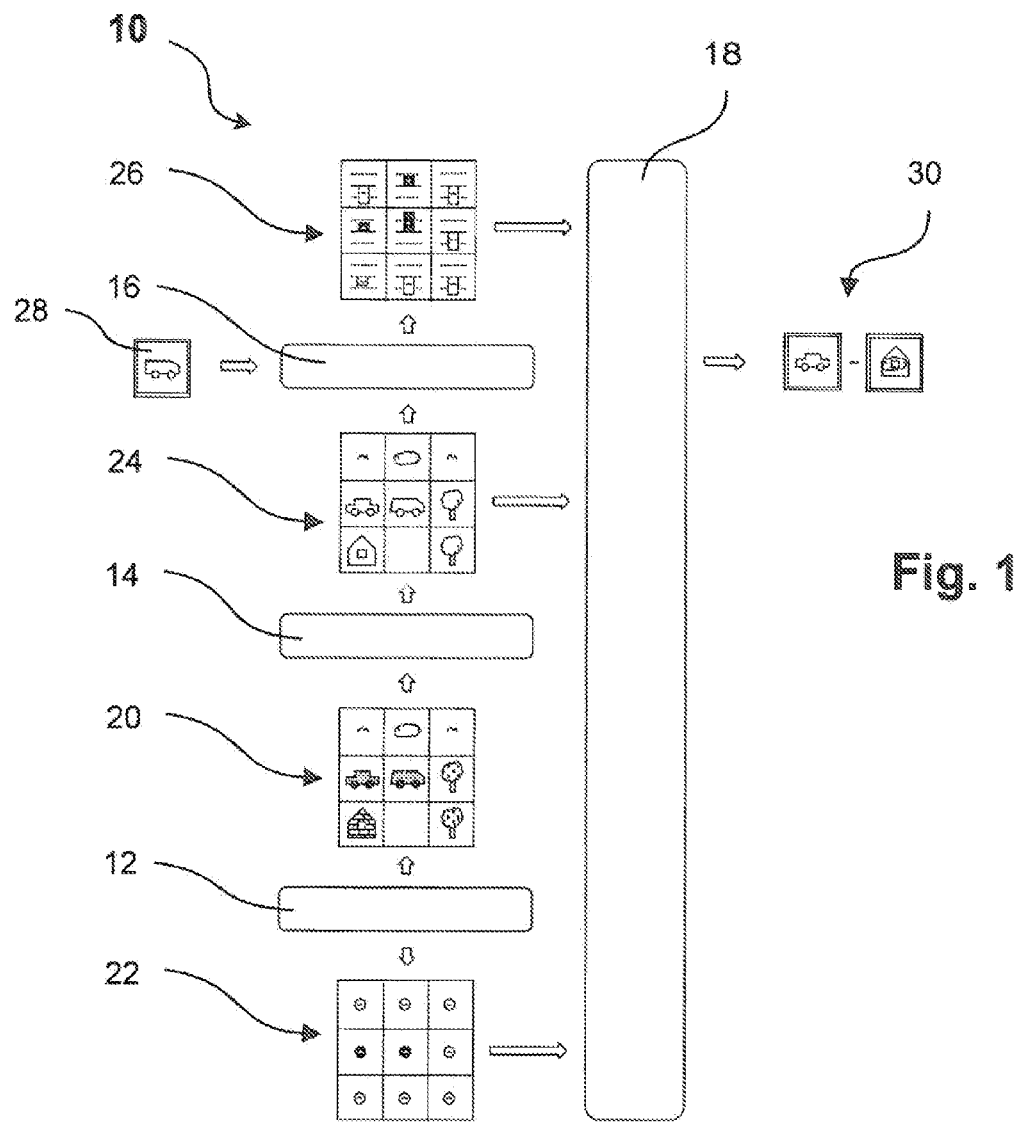
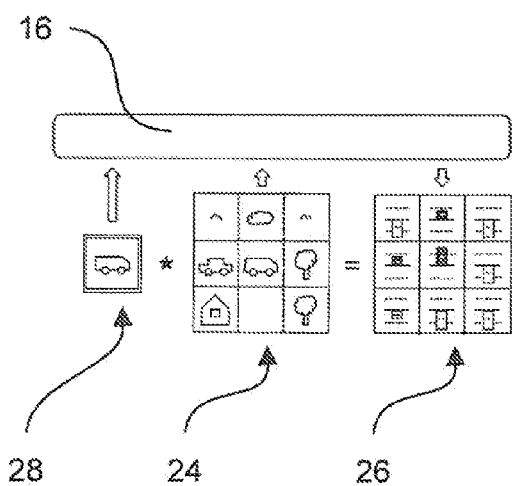

AUTOMATIC LEARNING METHOD FOR THE AUTOMATIC LEARNING OF FORMS OF APPEARANCE OF OBJECTS IN IMAGES

CROSS-REFERENCE TO RELATED APPLICATIONS

This application is the U.S. National Phase of, and Applicant claims priority from, International Application No. PCT/DE2012/100238 filed 13 Aug. 2012, and German Patent Application No. DE 10 2011 113 154.3 filed 14 Sep. 2011, both of which are incorporated herein by reference in their entirety.

BACKGROUND

The invention relates to an automatic learning method for the automatic learning of the forms of appearance of objects in images in the form of object features from training images for using the learned object features in an image processing system and to a device for carrying out the method.

Such an image processing system can here comprise an object detection system, an object tracking system or an image recording system.

The purpose of object detection systems is the location and classification of objects (for example, vehicles or persons) in digital images. They are used, for example, in motor vehicles, where the surroundings and particularly the area in front of the motor vehicle needs to be investigated for objects such as other vehicles or pedestrians, or in the robotics sector, where the surroundings are to be searched for certain objects by a freely movable robot.

The purpose of object tracking systems is the retrieval of an object (for example, of a vehicle or of a person) in an image of an image sequence, with the prerequisite that its position, dimensions and form of appearance in one or more previous images of the image sequence are known.

The purpose of image recording systems is the determination of image transformations (for example, translations) between two images, which make it possible to cause the images to overlap by using the transformation. For example, methods for generating panoramic images cause the overlapping areas of two images to overlap in order to generate a total image (so-called stitching). From the relative positions of the image contents in two images, it is possible to determine the necessary transformation information.

The methodology of the monitored automatic learning of an object detection system uses a preferably large number of annotated training images which contain or represent both the image contents of the objects to be learned and also their image backgrounds. An image area around an image position in which an object to be learned is located in the training image is referred to as a positive training example, and it is annotated positively. Image areas in the training image in which no objects to be learned are located (in the image background) are referred to as negative training examples (negative annotation).

During the training of the object detection system, positive and negative training examples from the training images are used, in order to learn object features therefrom, which allow as unambiguous as possible a separation of object and background. The resulting learned object features are used in the object detection system for the purpose of allowing in any images (images not seen in the training) the detection of the learned object.

A basic problem here is the required processing of a preferably large number of positive and negative training examples, which is needed for the acquisition of the possibly multifaceted forms of appearance of backgrounds and objects. For example, let us assume a training image of size 1000×1000 pixels, in which an object of size 100×100 pixels is located. While in this case exactly one positive training example is given, (1000−100+1)×(1000−100+1)−1=811,800 usable negative training examples of size 100×100 pixels are contained in the training image, which overlap in the image plane.

A desirable processing of a large number of training examples is therefore of great interest both from the functional point of view (training of a larger variance of forms of appearance) as well as from an operational point of view (expense in terms of time and processing technology).

In the image tracking systems, the annotated training images consist of the images of an image sequence, in which the position, dimensions and form of appearance of the object to be tracked are already known from previous images of the image sequence or annotated. An initial annotation can occur, for example, by a user (marking of the object to be tracked), by an object detection system, or by the detection of moving objects. While, in an object tracking system, positive annotations (positive training examples) are available only from the previous images of the image sequence—and thus only in a small number—such a system benefits all the more from the rapid learning of many negative annotations (object backgrounds, negative training examples). This provides in particular large information content because they differ little from image to image. By comparison, an object detection system must be trained often against negative annotations (object backgrounds) which are not necessarily identical to the object backgrounds occurring in the operational use.

For recording two images in an image recording system, one of the two images is interpreted as a training image, and the other as a test image. The determination of the positive annotations in the training image has to be established specifically for the recording task and the transformation information to be determined therewith in terms of number and position. For example, for generating panoramic images, one or more positive annotations at fixed positions in the expected overlap area of two images are selected (for example, at the right image margin). The rest of the image is considered to have a negative annotation. Alternatively, positive annotations can be generated by manual or automatic determination of prominent image areas, i.e., by determining image areas that are particularly suitable for their retrieval in the test image (for example, highly structured image areas). If more than two images (for example, an image sequence) are to be recorded together, positive and negative annotations in appropriate form can be selected in more than one image in the sequence (in the sense of several training images).

While, in contrast to object detection systems and the object tracking systems, in the case of image recording systems, the aim is the retrieval of general image contents (not necessarily objects) in different images, the term objects is used below for the purpose of a simplified formulation. Accordingly, objects denote image contents that are to be located in images without being confused with other image contents.

The prior art is an explicit generation of a large number of positive and negative training examples in the form of feature data vectors with their explicit processing in an automatic learning approach (for example, support vector machine or neuronal network).

The conventional methods solve this problem in a discretized form. Individual training examples are here extracted in a discrete manner in the areas determined by the annotation images and converted to individual feature data vectors. Since, as a result of overlap in the image plane, a large number of such training data vectors can be obtained from a single feature image, typically only a small subquantity is selected in this step in order to reduce the computation expenditure. The resulting general validity of the object feature contributions that can be obtained from a training image in a single process step is consequently limited.

SUMMARY

Based on this, the problem of the invention is to provide for rapid processing of a large number of positive and negative training examples (annotations), in the training of an image processing system.

The solution to this problem results from the features of the independent claims. Advantageous variants and embodiments are the subject matter of the dependent claims. According to the invention, the problem is solved by an automatic learning method having the following steps:

providing training images and associated annotation images, wherein at least one training image contains the representation of an object to be learned, and the associated annotation images have positive annotation values (annotations) at positions of objects in the training image;

producing at least one feature image from a training image, wherein a feature at an image position in the feature image is extracted from the surroundings of the corresponding image position in the training image;

generating a classification image from the feature image and object features, which contains information on the degree of similarity between the object features and the feature image in the form of classification responses;

determining a feature contribution of the training image to the object features by weighted summation of training image features by linear filtering operations at least from the annotation image, the feature image and the classification image. Linear filtering operations are standard operations from the field of image and signal processing (see, for example, textbook by R. C. Gonzales, R. E. Woods, Digital Image Processing, Third Edition, Pearson Prentice Hall).

The invention, from a functional point of view, allows the training of a larger variance of forms of appearance of objects and backgrounds, as a result of which the robustness of the system in its use on untrained images is increased. From an operational point of view, the invention makes it possible to perform faster training runs. This allows a more rapid adaptation of object detection systems to changed conditions with regard to the objects to be detected or the background structures to be expected—including dedicated training runs in the operational running of the object detection system.

the feasibility of a larger number of training and evaluation runs for the successive optimization of the object detection system (for example, training runs under parameter variations), and performing rapid training runs for the learning-based object tracking or image recording in real time on image data streams (video data streams).

Alternatively for a faster performance of training runs, the invention allows the performance of said training runs on hardware architectures with lower processing speeds (for example, mobile hardware architectures).

The invention is explained in further detail below using a preferred embodiment example in reference to the appended drawings.

SUMMARY OF THE DRAWINGS

FIG. 1 shows a diagrammatic overview representation of the learning unit according to the invention;

FIG. 2 shows a diagrammatic representation of the work procedure of the classification unit;

DETAILED DESCRIPTION

Figure 3:
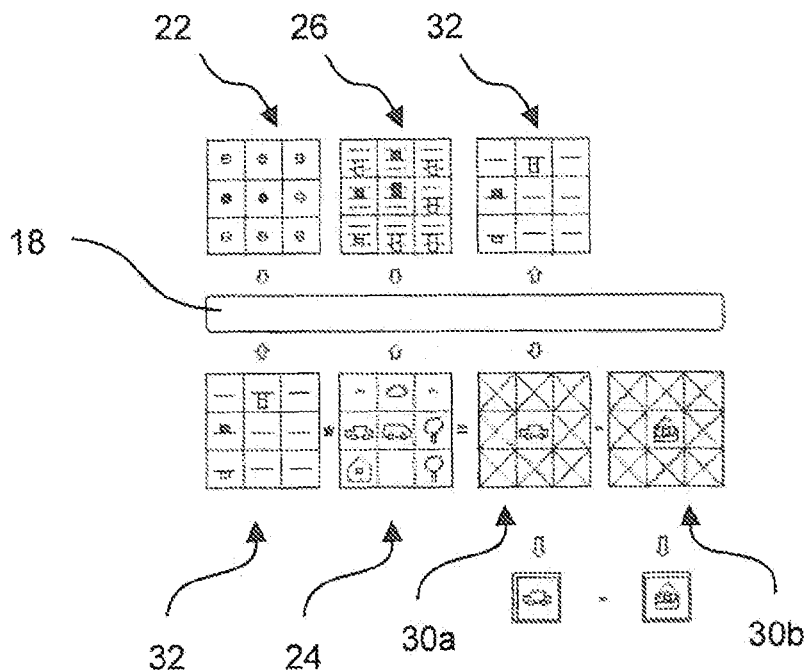
FIG. 3 shows a diagrammatic representation of the work procedure of the fusion unit.

In FIG. 1, the learning unit 10 according to the invention is represented diagrammatically. The latter comprises at least a training image unit 12, a feature extraction unit 14, a classification unit 16 as well as a feature fusion unit 18. An additional optional subunit, the initialization unit, is used exclusively for initializing object features and is therefore not represented in FIG. 1.

The task of the learning unit 10 is to acquire the form of appearance of objects and backgrounds in training images 20 in an efficient manner. The acquisition occurs by the determination of the object feature contributions of each training image 20. Such an application of the learning unit 10 to several training images 20 makes it possible to combine the desired object features from the object feature contributions of the individual training images 20. An embodiment of the combination of the object feature contributions is obtained by their averaging.

The task of the initialization unit, which is not represented, is to provide an initial estimation of object features. An embodiment of the initialization unit is obtained by a random or uniform initialization of the object features. An alternative embodiment uses the training image unit and the feature extraction unit for obtaining an initial estimation of object features on the basis of the objects represented in the training images.

The task of the training image unit 12 is to provide training images 20 and annotation images 22. The training images 20 can be real sensor images, synthetic images generated by computer graphics, or mixed forms of the two. In addition to the training image 20 itself, the training image unit 12 makes available an annotation image 22. From the annotation image 22, it is possible to determine in which image positions in the training image 20 the objects to be learned are located (positive annotations). Image positions in the training image 20 at which no objects to be learned are located (for example, in the image background) are negatively annotated. The image sections in the training image 20 which comprise the object to be learned are referred to as positive training examples. Image sections in the training image background of the same size as the object to be learned are referred to as negative training examples. In Figure FIG. 1, a training image 20 with associated annotation image 22 is shown symbolically. For reasons pertaining to simplifying the representation, the image plane is subdivided into a simpler 3×3 grid.

An advantageous embodiment of the training image unit 12 for an object detection system is obtained with a computer graphics system in which the objects to be trained can be generated, using 3D models if the image position is known, synthetically under any representation conditions (for example, illumination) in front of any background in any number.

The task of the feature extraction unit 14 is the conversion of a training image 20 into one or more feature images 24. A simple embodiment of the feature extraction unit 14 consists of the generation of an edge image by edge image operations. Several feature images 24 can be obtained, for example, by using a filter bank with directional filters. FIG. 1 symbolically shows the results of an edge image operation as feature image 24.

The task of the classification unit 16 is the conversion of a feature image 24 into a classification image 26. The entries of the classification image 26, which are referred to as classification response, are a measurement of the similarity between object features and the feature image 24 in the local environment of the corresponding image position. Higher classification responses indicate a larger similarity.

The object features 28 supplied to the classification unit 16 originate either from the initialization unit which is not shown, or from object features which originate, as a result of combination (for example, averaging), from previously determined object feature contributions from training images 20. A preferred embodiment of the classification unit 16 for calculating the similarity measurements is obtained by an image correlation between object features and feature image, which is shown in FIG. 2. If more than one feature image 24 per training image 20 is generated in the feature extraction unit 14, then the classification unit 16 should be used on each feature image.

The task of the feature fusion unit 18 is to fuse as efficiently as possible a possibly larger number of differently weighted areas of the feature image 24 by addition and thereby to determine the sought feature contribution 30 of a training image 20 to the object features. For the determination of the weights, the feature fusion unit 18 uses the annotation image 22 and the classification image 26.

The operating mode of the feature fusion unit 18 is represented symbolically in FIG. 3 and can be divided into two steps.

At image positions where, according to annotation image 22, an object is represented, a high classification response should occur if the object features are optimally selected. If this is not the case, this indicates that new object feature structures are present in the feature image 24, which are not yet represented sufficiently in the employed object features, for example, due to a shape of the object in the training image, which has not yet been learned. The corresponding area of the feature image 24 therefore must enter with a positive weighting in the determination of the object feature contributions of the training image 20. Advantageously, the positive weighting at an image position is selected to be larger, the smaller the classification response at a corresponding image position has turned out to be.

At image positions where, according to annotation image 22, no object is represented, a low classification response should occur if the object features are selected optimally. If this is not the case, this indicates that background feature structures are present in the feature image 24, which have an excessive similarity with the used object features. The corresponding area of the feature image 24 therefore must enter with a negative weighting in the determination of the object feature contributions of the training image 20. Advantageously, the negative weighting at an image position is selected to be more strongly negative the higher the classification response at a corresponding image position has turned out to be.

At image positions where, according to annotation image 22, an object is represented and the classification response turns out to be sufficiently large—for example, it is above a threshold—a weight of zero can be assigned to this image position. At image positions, where according to annotation image 22 no object is represented, and the classification response turns out to be sufficiently small—for example, it is below a threshold—a weight of zero can be assigned to this image position.

In accordance with the above-described method, a weight is assigned to each image position in the feature fusion unit 18, and the results are assigned to a weight image 32.

The task of the second step represented at the bottom of FIG. 3 is the weighted summation of feature areas in accordance with the weights determined in the first step. Step two makes advantageous use of the property of linear filtering operations, wherein the weights of a filter mask determine with which weighting which portions of a signal should be summed. Here, it should be pointed out that the linear filtering operations described here, in terms of their functional goal, must not be confused with filtering observations such as those used, for example, in the object detection for measuring similarities or for feature extraction.

Figures 4A, 4B:
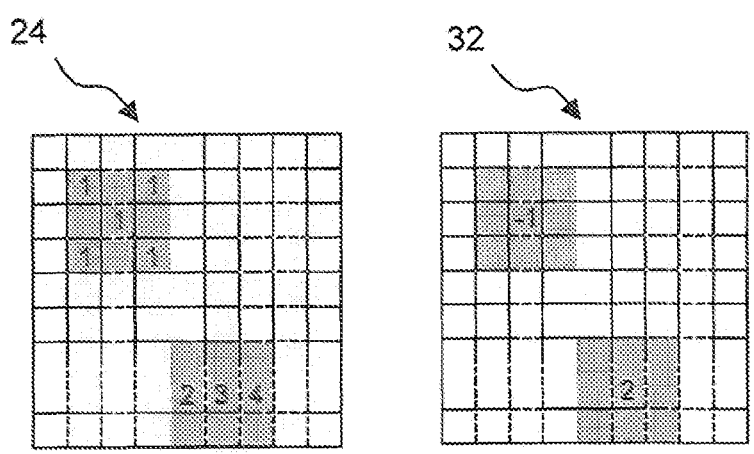
FIG. 4 shows a representation as an example of the filtering process in the fusion unit.
Figure 4C:
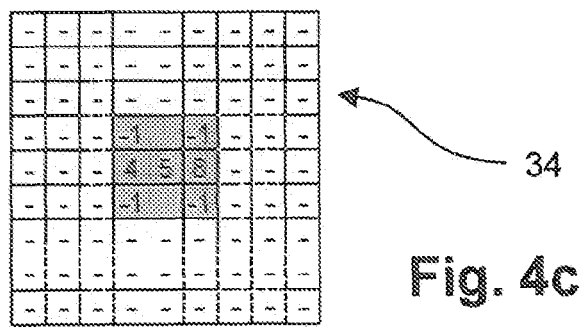

The performance of the fusion is illustrated as an example in reference to FIG. 4, which shows a feature image 24 with several entries that are different from zero (zeroes are not represented in the representation). Here, the problem consists in summing the gray-marked image areas with predetermined weights. The image positions of the image areas to be summed are entered with their weights to be used in the weight image 32. This task is now performed by filtering the feature image 24 (M) by the weight image 32 (G), noted as (G*M). Here, the symbol "*" represents the filtering operation. In the result image 34 (G*M), the entries located outside of the central image area are ignored, which is represented by a line. As one can see, the sum of the weighted image areas from the feature image 24 is located in the result image 34.

The task of the two steps of the feature fusion represented at the bottom of FIG. 3 can accordingly be accomplished by interpreting the weight image 32, which is obtained in the first step represented at the top of FIG. 3, as a filter mask, in order to achieve the desired weighted summation of feature areas by linear filtering of the feature image 24 with the weight image 32. The filtering of the feature image 24 with the weight image 32 can advantageously be carried out after the transformation of the two images by fast Fourier transformation in the frequency domain by simple element by element multiplication. The mentioned methodology for carrying out filtering operations in the frequency domain by using the so-called convolution theorem is described, for example, in the textbook by R. C. Gonzales and R. E. Woods (Digital Image Processing, Third Edition, Pearson Prentice Hall). Using this methodology, the areas of the feature image 24, in contrast to the prior art, do not have to be generated explicitly in the form of feature data vectors; instead, they are implicitly generated, weighted and summed within the filtering operation.

In FIGS. 1 and 3, the feature contributions of positive and negative weights are shown separately exclusively for an understandable representation. The feature fusion unit generates the sum of the two contributions.

If more than one feature image 24 is generated in the feature extraction unit 14, and more than one classification image 26 is generated in the classification unit 16, a corresponding number of feature contributions are generated in the feature fusion unit 18.

LIST OF REFERENCE NUMERALS

10 Learning unit
12 Training image unit
14 Feature extraction unit
16 Classification unit
18 Feature fusion unit
20 Training image
22 Annotation image
24 Feature image
26 Classification image
28 Object feature
30 Feature contribution
32 Weight image
34 Result image

The invention claimed is:

1. An automatic learning method for automatic learning of forms of appearance of objects in images in a form of object features from training images for using learned object features in an image processing system, the method comprising:
providing training images and associated annotation images, wherein a training image contains a representation of an object to be learned, and an associated annotation image has positive annotations at positions of objects in the training image and negative annotations at positions in the training image where no object to be learned is represented;
producing a feature image from the training image, wherein a feature at an image position in the feature image is extracted from surroundings of a corresponding image position in the training image;
generating a classification image from the feature image and object features, the classification image containing image positions at which classification responses are contained, the classification responses providing information on a degree of similarity between the object features and the feature image;
determining a feature contribution of the training image to the object features by weighted summation of training image features contained in the feature image using a linear spatial filtering operation based on information at least from the annotation image, the feature image, and the classification image.

2. The automatic learning method according to claim 1, wherein from the annotation image and from the classification image a weight image is generated, the weight image being used as a filter mask for the linear spatial filtering operation of the feature image.

3. The automatic learning method according to claim 1, wherein the linear spatial filtering operation occurs by determining the feature contribution using Fourier transformation in a frequency domain.

4. The automatic learning method according to claim 1, wherein the method comprises initializing the object features in which the object features are estimated automatically.

5. The automatic learning method according to claim 1, wherein provision of the training images occurs by sensor-based image acquisition, and wherein provision of the associated annotation images occurs by manual or automatic annotation.

6. The automatic learning method according to claim 1, wherein provision of the training images and the associated annotation images occurs based on synthetic image generation.

7. The automatic learning method according to claim 1, further comprising generating several feature images from the training image using different types of feature extractions.

8. The automatic learning method according to claim 7, further comprising determining a number of object features and classification images corresponding to the generated several feature images as well as training feature contributions.

9. The automatic learning method according to claim 1, wherein the learning method is used in an object detection method.

10. The automatic learning method according to claim 1, wherein the learning method is used in an object tracking method.

11. The automatic learning method according to claim 1, wherein the learning method is used in an image recording method.

12. A device for automatic learning of forms of appearance of objects in images in a form of object features from training images for using learned object features in an image processing system, the device comprising:
a processor; and
a memory storing instructions that, when executed by the processor, cause the processor to perform operations comprising:
providing training images and associated annotation images, wherein a training image contains a representation of an object to be learned, and an associated annotation image has positive annotations at positions of objects in the training image and negative annotations at positions in the training image where no object to be learned is represented;
producing a feature image from the training image, wherein a feature at an image position in the feature image is extracted from surroundings of a corresponding image position in the training image;
generating a classification image from the feature image and the object features, the classification image containing image positions at which classification responses are contained, the classification responses providing information on a degree of similarity between the object features and the feature image; and
determining feature contribution of the training image to the object features by weighted summation of training image features contained in the feature image using a linear spatial filtering operation based on information at least from the annotation image, the feature image, and the classification image.

13. The device according to claim 12, wherein the operations comprise initializing the object features in which the object features are estimated automatically.

14. The device according to claim 12, wherein the operations comprise determining the feature contribution using Fourier transformation in a frequency domain.

15. The device according to claim 12, wherein the operations comprise:
providing the training images using sensor-based image acquisition; and
providing the associated annotation images using manual or automatic annotation.

16. The device according to claim 12, wherein the operations comprise providing the training images and the associated annotation images based on synthetic image generation.

17. The device according to claim 12, wherein the operations comprise generating several feature images from the training image using different types of feature extractions.

18. The device to claim 17, wherein the operations comprise determining a number of object features and classification images corresponding to the generated several feature images as well as training feature contributions.

* * * * *